(12) United States Patent
Huang et al.

(10) Patent No.: US 8,118,443 B2
(45) Date of Patent: Feb. 21, 2012

(54) DISPLAY APPARATUS AND LIGHT SOURCE DEVICE USED IN THE DISPLAY APPARATUS

(75) Inventors: I-Ting Huang, Kaohsiung (TW);
Ching-Lung Chang, Taoyuan (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 410 days.

(21) Appl. No.: 12/542,705

(22) Filed: Aug. 18, 2009

(65) Prior Publication Data

US 2010/0296269 A1    Nov. 25, 2010

(30) Foreign Application Priority Data

May 22, 2009   (TW) .............................. 98117173 A

(51) Int. Cl.
*F21V 9/00* (2006.01)
*G02F 1/13357* (2006.01)
(52) U.S. Cl. .................. 362/97.3; 362/231; 362/612
(58) Field of Classification Search ............ 362/97.3, 362/231, 612, 97.2, 230, 613, 800, 545, 249.02, 362/311.02
See application file for complete search history.

(56) References Cited

U.S. PATENT DOCUMENTS

| | | | |
|---|---|---|---|
| 2008/0298053 A1* | 12/2008 | Van Gorkom et al. | 362/231 |
| 2009/0147501 A1* | 6/2009 | Chang et al. | 362/97.3 |
| 2010/0008071 A1* | 1/2010 | Kim et al. | 362/97.3 |
| 2010/0067219 A1* | 3/2010 | Tu et al. | 362/97.1 |

* cited by examiner

*Primary Examiner* — Bao Q Truong
(74) *Attorney, Agent, or Firm* — Jianq Chyun IP Office

(57) ABSTRACT

A light source device including light-emitting diodes (LEDs) and a carrier is provided. Chromaticities of some LEDs fall in a first area of a chromaticity coordinate diagram, while chromaticities of the other LEDs fall in a second area of the chromaticity coordinate diagram. The second area and the first area are point symmetric to a white center of the chromaticity coordinate diagram. A chromaticity coordinate value farthest from the white center in the first area is $(X_1, Y_1)$, and a chromaticity coordinate value farthest from the white center in the second area is $(X_2, Y_2)$, wherein $0.06 \geq |X_1 - X_2| \geq 0.03$ and $0.06 \geq |Y_1 - Y_2| \geq 0.03$. The LEDs are disposed on the carrier, and a chromaticity difference of any two adjacent LEDs in the chromaticity coordinate diagram is $(\Delta X, \Delta Y)$, wherein $|\Delta X| \leq 0.01$ and $|\Delta Y| \leq 0.01$.

16 Claims, 4 Drawing Sheets

DISPLAY APPARATUS AND LIGHT SOURCE DEVICE USED IN THE DISPLAY APPARATUS

CROSS-REFERENCE TO RELATED APPLICATION

This application claims the priority benefit of Taiwan application serial no. 98117173, filed May 22, 2009. The entirety of the above-mentioned patent application is hereby incorporated by reference herein and made a part of specification.

BACKGROUND OF THE INVENTION

1. Field of the Invention

The present invention relates to a display apparatus and a light source device used in the display apparatus. More particularly, the present invention relates to a display apparatus having a high cost-effectiveness and a light source device used in the display apparatus.

2. Description of Related Art

Since a light-emitting diode (LED) has advantages of long lifespan, small-size, high shock-resisting capability, low heat-irradiation and low power consumption, etc., it has been widely applied to backlight modules of flat panel displays and a general illumination domain. During a fabrication process of the LED, due to differences of time, temperature, machine and material or other variation factors in the fabrication process, quality of each completed LED is slightly different. Therefore, after the fabrication, the LEDs are further tested and classified, so as to classify the LEDs into different bins. Generally, a classification standard of the LEDs includes a wavelength, a light-emitting intensity, a light-emitting angle, a chromaticity or a working voltage, etc.

The chromaticity is generally used as the classification standard for classifying white LEDs used in a display apparatus. Since human eyes are sensitive to colors, if unclassified white LEDs are used as a light source of the display apparatus, a user may easily feel an uneven brightness or a color shift phenomenon of a screen. In other words, an overall visual effect represented by the display apparatus is influenced. Therefore, a requirement for the chromaticities of the white LEDs used in the display apparatus is rather high. Generally, only a few white LEDs of which bins being around a white center of a chromaticity coordinate diagram are used.

However, in the white LEDs of a same production lot, there are only a small number of the white LEDs with the chromaticities thereof falling around the white center of the chromaticity coordinate diagram, so that cost of the white LEDs is relatively high. Therefore, to maintain the display quality of the display apparatus, the cost of the white LEDs cannot be reduced.

SUMMARY OF THE INVENTION

The present invention is directed to a light source device containing white light-emitting diodes (LEDs) of different bins, which avails reducing a cost.

The present invention is directed to a display apparatus, which uses white LEDs of different bins as a light source, so as to reduce a cost.

The present invention provides a light source device including a plurality of LEDs and a carrier. Chromaticities of a part of the LEDs fall in a first area of a chromaticity coordinate diagram, while chromaticities of the other LEDs fall in a second area of the chromaticity coordinate diagram. The second area and the first area are point symmetric to a white center of the chromaticity coordinate diagram. A first chromaticity coordinate value farthest from the white center in the first area is $(X_1, Y_1)$, and a second chromaticity coordinate value farthest from the white center in the second area is $(X_2, Y_2)$, wherein $0.06 \geq |X_1-X_2| \geq 0.03$ and $0.06 \geq |Y_1-Y_2| \geq 0.03$. The LEDs are disposed on the carrier, and a chromaticity difference of any two adjacent LEDs in the chromaticity coordinate diagram is $(\Delta X, \Delta Y)$, wherein $|\Delta X| \leq 0.01$ and $|\Delta Y| \leq 0.01$.

In an embodiment of the present invention, the carrier is a printed circuit board or a metal board.

In an embodiment of the present invention, the carrier is a bar-shape carrier.

In an embodiment of the present invention, the LEDs are arranged in a line.

In an embodiment of the present invention, the LEDs are arranged in an array.

The present invention provides a display apparatus including the aforementioned light source device, a display panel and a substrate. The display panel has a display area and a non-display area, wherein the non-display area surrounds the display area. The substrate has a light-incident surface and a light-outlet surface, wherein the light-incident surface is disposed opposite to the light source device, and the light-outlet surface is disposed opposite to the display panel.

In an embodiment of the present embodiment, the light-incident surface is adjoined to the light-outlet surface.

In an embodiment of the present embodiment, there is a first space A between the light source device and an edge of the display area, and there is a second space P between any two adjacent LEDs, wherein $0.5 \leq A/P \leq 1$.

In an embodiment of the present embodiment, the substrate is a light guide plate or a diffuser plate.

In an embodiment of the present embodiment, the carrier of the light source device is a printed circuit board or a metal board.

In an embodiment of the present embodiment, the carrier of the light source device is a bar-shape carrier.

In an embodiment of the present embodiment, the LEDs of the light source device are arranged in a line.

In an embodiment of the present embodiment, the LEDs of the light source device are arranged in an array.

In an embodiment of the present embodiment, the substrate is a diffuser plate or a light guide plate.

In an embodiment of the present invention, the display apparatus further includes optical films disposed above the light-outlet surface.

In the light source device of the present invention, the white LEDs of multiple bins are applied to serve as the light source, and configurations and spaces of the white LEDs are suitably adjusted to provide an ideal white light. Therefore, by using the light source device of the present invention, a whole cost of the display apparatus can be reduced.

In order to make the aforementioned and other features and advantages of the present invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
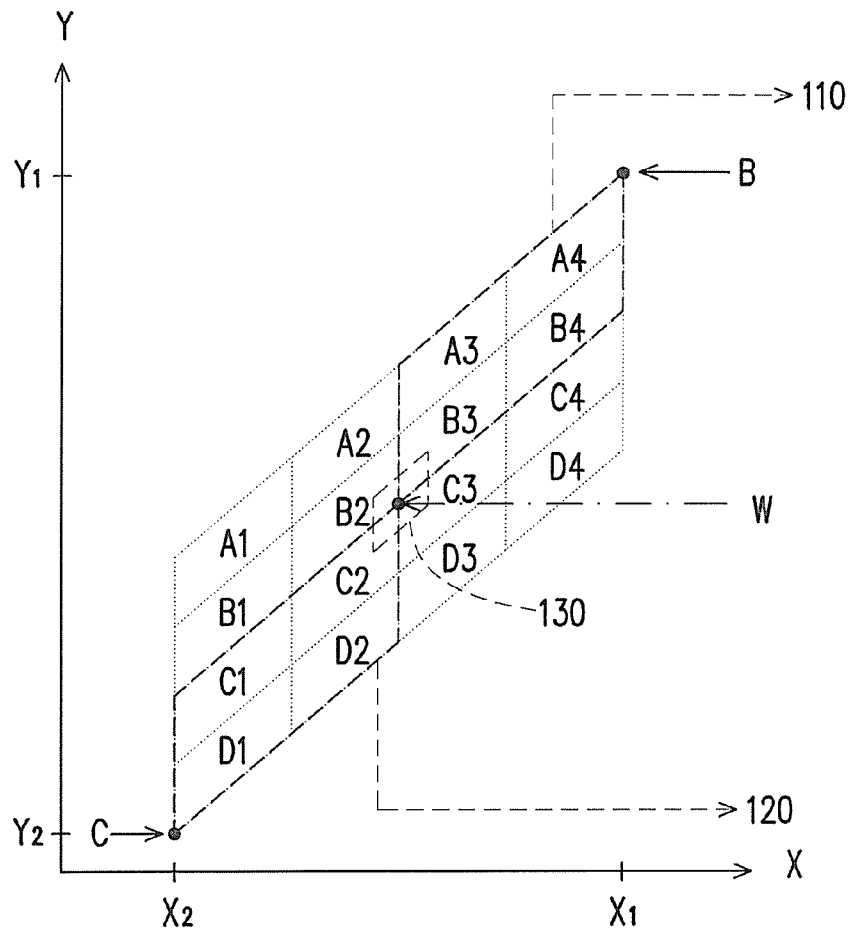
FIG. 1 is a chromaticity coordinate diagram illustrating different bins of white LEDs classified therein.

Generally, light-emitting diodes (LEDs) are further tested and classified after being fabricated, so as to be classified into different bins. FIG. 1 is a chromaticity coordinate diagram illustrating different bins of the white LEDs classified therein. Referring to FIG. 1, according to different chromaticities, the white LEDs are, for example classified into sixteen bins of A1, A2, A3, A4, B1, B2, B3, B4, C1, C2, C3, C4, D1, D2, D3 and D4 in the chromaticity coordinate diagram. In detail, the chromaticities of different white LEDs of each bin are similar but can be slightly different, i.e. each of the bins is actually demarcated according to a specific chromaticity distribution range.

It should be noticed that only 16 bins are taken as an example for the following descriptions. In other possible embodiments, the chromaticity bins of the white LEDs can be finely classified, so that the number of the obtained bins is more than 16. Alternatively, chromaticity bins of the white LEDs can also be roughly classified, so that the number of the obtained bins is less than 16, which is determined according to an actual demand of a user.

Actually, in the chromaticity coordinate diagram, only the color presented by a white center W is regarded as pure white by human eyes, i.e. the color presented by the white center W is not mixed with other colors such as red, green and blue, etc. Therefore, the LEDs with the chromaticities thereof falling at the white center W can be taken as the ideal white light source. Comparatively, the white light emitted from the white LEDs with the chromaticities thereof falling in the A4 bin may be a white light with a slight yellow, and the white light emitted from the white LEDs with the chromaticities thereof falling in the D1 bin may be a white light with a slight cyan.

Considering a sensitivity of the human eyes for the colors and a display quality of the display apparatus, a requirement for the chromaticities of the white LEDs used in the light source device of the display apparatus is rather high. Therefore, the white LEDs are applied to the display apparatus only when the chromaticities of the white LEDs fall in a white center area 130 around the white center W, so as to guarantee the display quality of the display apparatus. However, the number of the white LEDs with the chromaticities thereof falling in the white center area 130 is quite small in a same production lot, so that the cost of the pure white LEDs is relatively high. Therefore, to maintain the display quality of the display apparatus and reduce the cost, the present invention provides several light source devices and display apparatus, in which the white LEDs of various bins are used.

Figure 2:
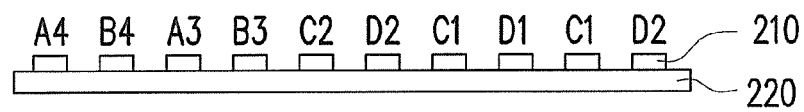
FIG. 2 is a side view of a light source device according to an embodiment of the present invention.

FIG. 2 is a side view of a light source device according to an embodiment of the present invention. Referring to FIG. 2, the light source device 200 includes a plurality of LEDs 210 and a carrier 220, wherein the LEDs 210 are disposed on the carrier 220. In the present embodiment, the carrier 220 can be a printed circuit board (PCB) and has a bar-shape. In other embodiments, the carrier 220 can also be a metal board. Moreover, the LEDs 210 of the present embodiment are, for example, arranged in a line as that shown in FIG. 2. To be specific, the light source device 200 of the present embodiment is a light bar.

Referring to FIG. 1 and FIG. 2, the chromaticities of a part of the LEDs 210 of the light source device 200 fall in a first area 110 of the chromaticity coordinate diagram, while the chromaticities of the other LEDs 210 fall in a second area 120 of the chromaticity coordinate diagram. Moreover, the second area 120 and the first area 110 are point symmetric to the white center W. In other words, the chromaticities of the LEDs 210 can be mutually compensated in chromaticity, approximately. Therefore, the light source device 200 can present the ideal white light. Namely, an overall light-emitting effect of the light source device 200 can satisfy a requirement of the light source of the display apparatus. Further, costs of the white LEDs of different bins are different, and the costs of the white LEDs with the chromaticities thereof falling in the white center area 130 are most expensive. Therefore, by using the LEDs 210 with the chromaticities thereof falling in the first area 110 and the second area 120, the cost of the light source device 200 can be effectively reduced.

In detail, in the present embodiment, the first area 110 includes the chromaticity distribution ranges of the white LEDs of four bins A3, A4, B3 and B4. The second area 120 includes the chromaticity distribution ranges of the white LEDs of four bins C1, C2, D1 and D2. It should be noticed that divisions of the first area 110 and the second area 120 are not limited thereto, and in other possible embodiment, the first area 110 can include the chromaticity distribution ranges of the white LEDs of four bins C3, C4, D3 and D4 while the second area 120 can include the chromaticity distribution ranges of the white LEDs of four bins A1, A2, B1 and B2.

In detail, the first area 110 has a point B located farthest from the white center W, and a coordinate value of the point B in the chromaticity coordinate diagram is $(X_1, Y_1)$. The second area 120 has a point C located farthest from the white center W, and a coordinate value of the point C in the chromaticity coordinate diagram is $(X_2, Y_2)$. In the present embodiment, a relation between the coordinate values $(X_1, Y_1)$ and $(X_2, Y_2)$ is that $0.06 \geq |X_1 - X_2| \geq 0.03$ and $0.06 \geq |Y_1 - Y_2| \geq 0.03$. Since the chromaticity range of the applicable LEDs 210 is relatively wide, the cost spent on purchasing the LEDs 210 is reduced.

It should be noticed that to make the light source device 200 emitting the ideal white light, the LEDs 210 of different bins are arranged according to a certain rule. Particularly, a chromaticity difference of any two adjacent LEDs 210 on the carrier 220 in the chromaticity coordinate diagram is $(\Delta X, \Delta Y)$, wherein $|\Delta X| \leq 0.01$ and $|\Delta Y| \leq 0.01$. The smaller the chromaticity difference of the adjacent LEDs is, the better the light-mixing effect between the LEDs 210 is. Therefore, the light source device 200 is not liable to have a bright fringe phenomenon or an uneven light-mixing phenomenon, i.e. the light source device 200 of the present embodiment can provide a uniform light source.

For example, in the present embodiment, chromaticity bins of the LEDs 210 arranged in a line on the carrier 220 are sequentially A4, B4, A3, B3, C2, D2, C1, D1, C1, D1, C1 and D2 from one end to another. In other possible embodiments, the chromaticity bins of the LEDs 210 arranged in a line on the carrier 220 may be sequentially B4, A4, A3, B3, C2, D2, D1, C1, D1 and D2 from one end to another. Certainly, the aforementioned arrangements of the LEDs 210 are only used as examples, and the present invention is not limited thereto. When the division ranges of the first area 110 and the second area 120 are changed, the arrangement of the LEDs 210 is accordingly changed.

Figure 3:
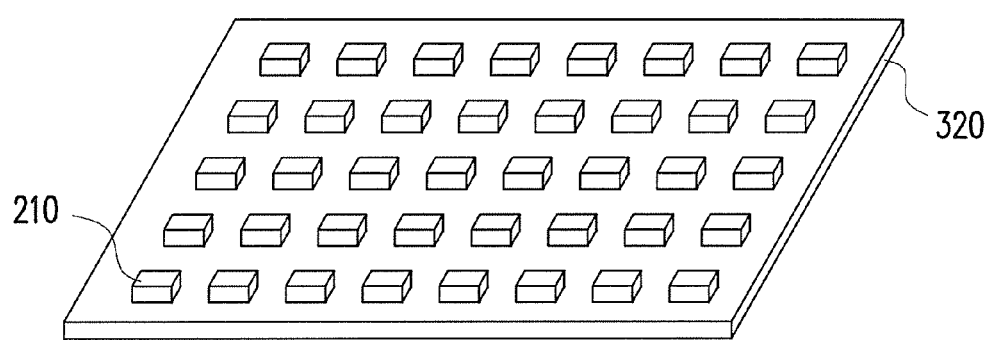
FIG. 3 is a three-dimensional view of another light source device according to an embodiment of the present invention.

FIG. 3 is a three-dimensional view of another light source device according to an embodiment of the present invention. Referring to FIG. 3, the LEDs 210 of the light source device 300 can be arranged in an array. Here, selection and arrangement of the LEDs 210 are similar as that described above, so that the light source device 300 can provide the substantial white light required by the display apparatus, and has a low cost. In brief, a fabrication cost of the display apparatus using the light source device 300 can be reduced, and meanwhile the display quality of the display apparatus can be maintained.

Figure 4A:
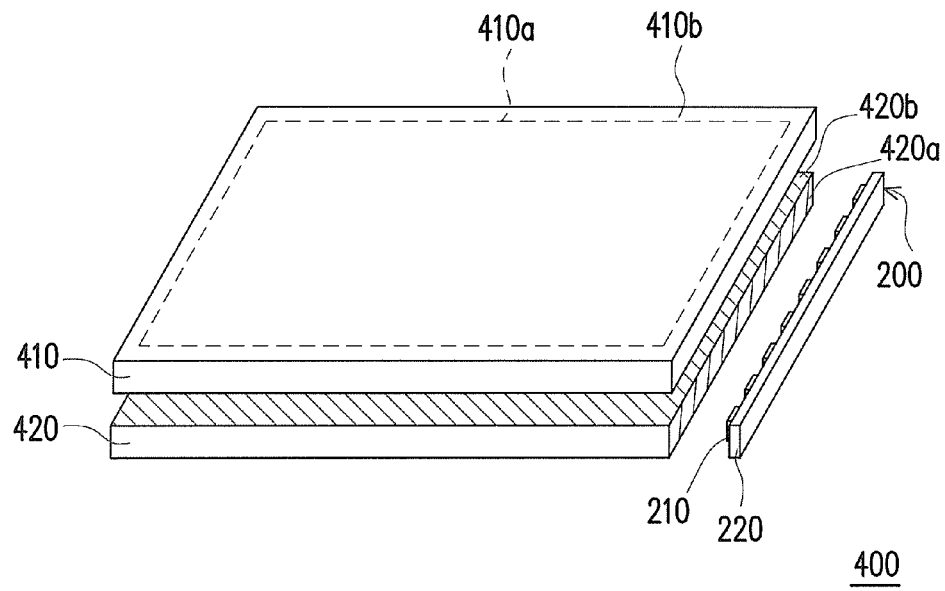
FIG. 4A is an exploded view of a display apparatus according to an embodiment of the present invention.
Figure 4B:
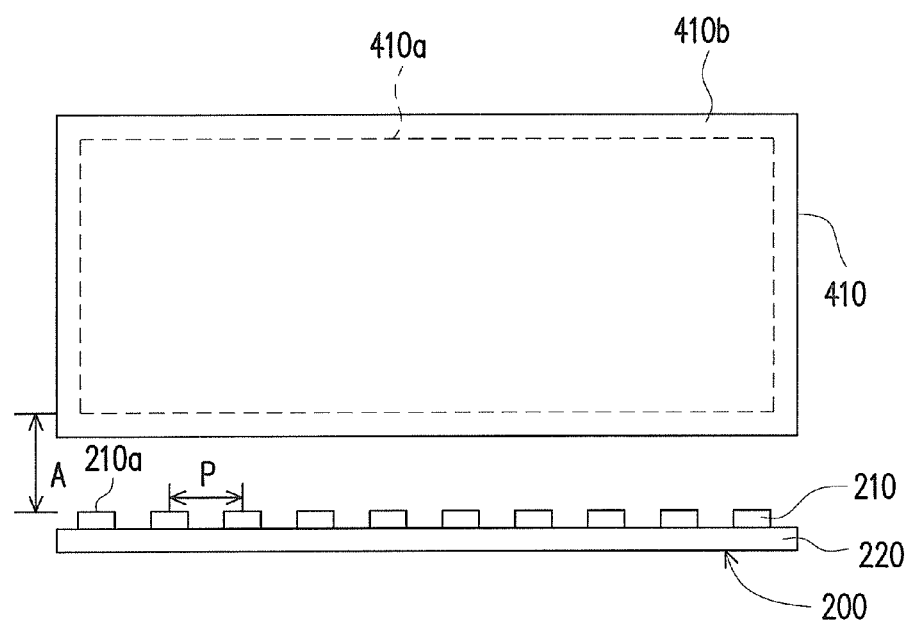
FIG. 4B is a top view of a display apparatus of FIG. 4A.

FIG. 4A is an exploded view of a display apparatus according to an embodiment of the present invention. FIG. 4B is a top view of the display apparatus of FIG. 4A. Referring to FIG. 4A, the display apparatus 400 includes a light source device 200, a display panel 410 and a substrate 420. The light source device 200 of the present embodiment is the same to the light source device 200 of the above embodiment, and therefore detailed descriptions thereof are not repeated.

The display panel 410 has a display area 410a and a non-display area 410b, wherein the non-display area 410b surrounds the display area 410a. The substrate 420 has a light-incident surface 420a and a light-outlet surface 420b, wherein the light-incident surface 420a is disposed opposite to the light source device 200, and the light-outlet surface 420b is disposed opposite to the display panel 410 as shown in FIG. 4A. It should be noticed that the light-incident surface 420a is adjoined to the light-outlet surface 420b. Namely, the display apparatus 400 has a side incident type light source.

Moreover, in the present invention, the display panel 410 is unnecessarily to be disposed adjacent to the substrate 420. For example, optical films (not shown) such as diffusers, and brightness enhancement films, etc. can be disposed between the display panel 410 and the substrate 420, i.e. the optical films are disposed above the light-outlet surface 420b of the substrate 420. In the present embodiment, the substrate 420 is a light guide plate. In other embodiments, the substrate 420 can also be a diffuser plate or a diffuser board.

A first space A between the light source device 200 and an edge of the display area 410a is configured. In detail, the first space A is defined as a distance between a light-outlet surface 210a of the LED 210 in the light source device 200 and the edge of the display area 410a. In addition, a second space P between any two adjacent LEDs 210 is configured. In detail, the second space P is defined as a distance between central points of any two adjacent LEDs 210, i.e. the pitch of any two adjacent LEDs 210. In the present embodiment, $0.5 \leq A/P \leq 1$.

Before the light emitted from the light source device 200 irradiates the light-incident surface 420a, a sufficient optical path is required for fully mixing the light emitted from different LEDs 210. In the present embodiment, a forward light-mixing optical path is the first space A. Similarly, a certain distance between any two adjacent LEDs 210 in the light source device 200 is required to be maintained, so as to provide a sufficient lateral light-mixing optical path. In the present embodiment, the lateral light-mixing optical path is the second space P. By adjusting a ratio of A/P, the light emitted from the light source device 200 can be preliminarily mixed, and then enters the light-incident surface 420a. Then, after being suitably reflected or refracted within the substrate 420, the light emits from the light-outlet surface 420b of the substrate 420 in a suitable light-emitting angle, and enters the display panel 410. When the light emitted from the light source device 200 of the display apparatus 400 is the sufficiently mixed white light, the bright and dark fringes or the color shift phenomenon caused by uneven light-mixing can be mitigated.

Figure 5:
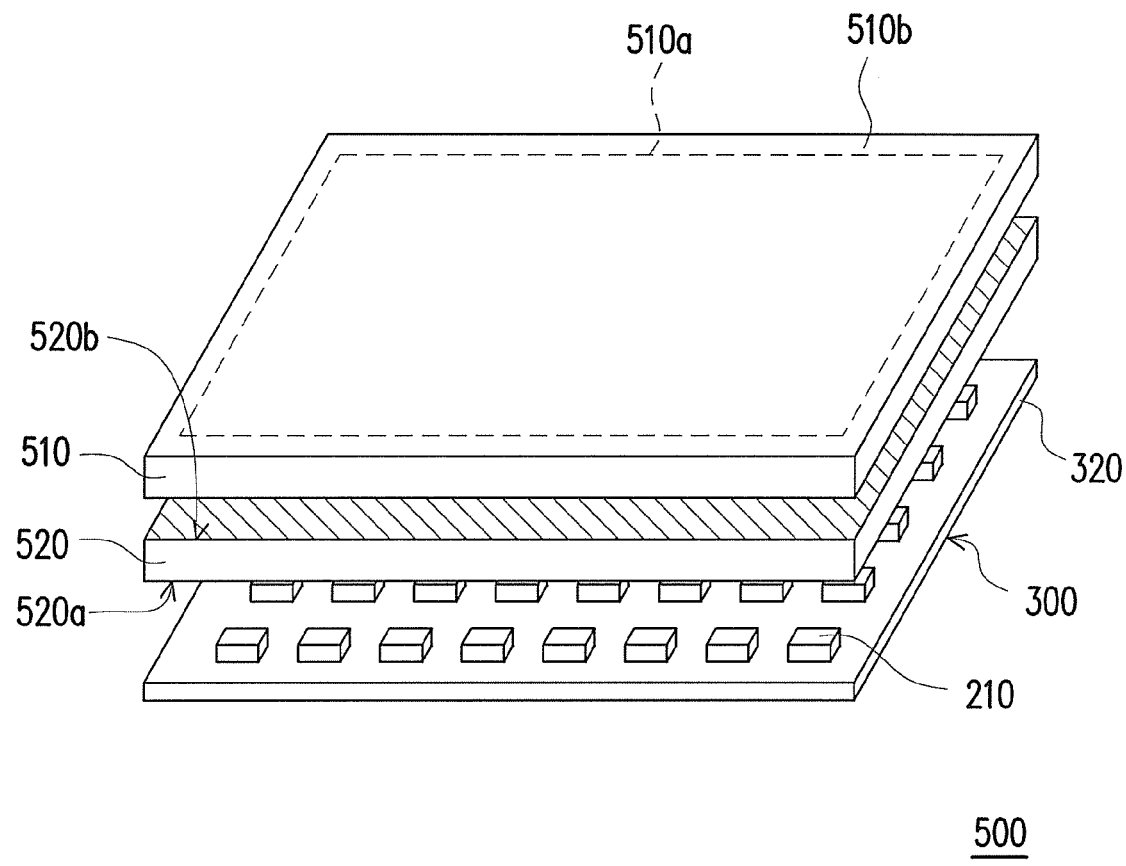
FIG. 5 is an exploded view of a display apparatus according to another embodiment of the present invention.

FIG. 5 is an exploded view of a display apparatus according to another embodiment of the present invention. Referring to FIG. 5, the display apparatus 500 includes a light source device 300, a display panel 510 and a substrate 520. The light source device 300 of the present embodiment is the same to the light source device 300 of the above embodiment, and therefore detailed descriptions thereof are not repeated.

The display panel 510 has a display area 510a and a non-display area 510b, wherein the non-display area 510b surrounds the display area 510a. The substrate 520 has a light-incident surface 520a and a light-outlet surface 520b, wherein the light-incident surface 520a is disposed opposite to the light source device 300, and the light-outlet surface 520b is disposed opposite to the display panel 510, as that shown in FIG. 5. It should be noticed that the light-incident surface 520a is disposed opposite to the light-outlet surface 520b. Namely, the display apparatus 500 has a direct type light source.

Moreover, in the present invention, the display panel 510 is unnecessarily to be disposed adjacent to the substrate 520. For example, the optical films (not shown) such as the diffusers, and the brightness enhancement films, etc. can be disposed between the display panel 510 and the substrate 520, i.e. the optical films are disposed above the light-outlet surface 520b of the substrate 520. In the present embodiment, the substrate 520 is a diffuser plate/board. In other embodiments, the substrate 420 can also be a light guide plate.

According to the above descriptions, it is known that the white light provided by the light source device 300 satisfy a demand of the display apparatus 500. Moreover, the LEDs of different bins are used to provide the light source required by the display apparatus 500, so that the cost of the display apparatus 500 is relatively low.

In summary, the light source device of the present invention uses the white LEDs of different bins to generate the white light. By suitably selecting the white LEDs of different bins, and by adjusting a distance between each two adjacent white LEDs and a distance between the white LED and the display area, a white light-mixing light source with a uniform color-mixture and without an obvious color shift phenomenon can be obtained. Therefore, a fabrication cost of the display apparatus using the light source device of the present invention can be effectively reduced, and a good display quality of the display apparatus can still be maintained.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A light source device, comprising:
a plurality of light-emitting diodes (LEDs), chromaticities of a part of the LEDs falling in a first area of a chromaticity coordinate diagram, while chromaticities of the other LEDs falling in a second area of the chromaticity coordinate diagram, the second area and the first area being point symmetric to a first white center of the chromaticity coordinate diagram, a chromaticity coordinate value farthest from the white center in the first area being $(X_1, Y_1)$ and a second chromaticity coordinate value farthest from the white center in the second area being $(X_2, Y_2)$, wherein $0.06 \geq |X_1-X_2| \geq 0.03$ and $0.06 \geq |Y_1-Y_2| \geq 0.03$; and
a carrier, the LEDs being disposed on the carrier, and a chromaticity difference of any two adjacent LEDs in the chromaticity coordinate diagram being (ΔX, ΔY), wherein |ΔX|≦0.01 and |ΔY|≦0.01.

2. The light source device as claimed in claim 1, wherein the carrier is a printed circuit board (PCB) or a metal board.

3. The light source device as claimed in claim 1, wherein the carrier is a bar-shape carrier.

4. The light source device as claimed in claim 3, wherein the LEDs are arranged in a line.

5. The light source device as claimed in claim 1, wherein the LEDs are arranged in an array.

6. A display apparatus, comprising:
a light source device as claimed in claim 1;
a display panel, having a display area and a non-display area, wherein the non-display area surrounds the display area; and
a substrate, having a light-incident surface and a light-outlet surface, wherein the light-incident surface is disposed opposite to the light source device, and the light-outlet surface is disposed opposite to the display panel.

7. The display apparatus as claimed in claim 6, wherein the light-incident surface is adjoined to the light-outlet surface.

8. The display apparatus as claimed in claim 7, wherein a first space A is configured between the light source device and an edge of the display area, and a second space P is configured between any two adjacent LEDs, wherein 0.5≦A/P≦1.

9. The display apparatus as claimed in claim 7, wherein the substrate is a light guide plate or a diffuser plate.

10. The display apparatus as claimed in claim 7, wherein the carrier of the light source device is a bar-shape carrier.

11. The display apparatus as claimed in claim 10, wherein the LEDs of the light source device are arranged in a line.

12. The display apparatus as claimed in claim 6, wherein the light-incident surface is disposed opposite to the light-outlet surface.

13. The display apparatus as claimed in claim 12, wherein the LEDs of the light source device are arranged in an array.

14. The display apparatus as claimed in claim 12, wherein the substrate is a diffuser plate or a light guide plate.

15. The display apparatus as claimed in claim 6, wherein the carrier of the light source device is a PCB or a metal board.

16. The display apparatus as claimed in claim 6, further comprising a plurality of optical films disposed above the light-outlet surface.

* * * * *